(12) United States Patent
Kudo

(10) Patent No.: US 7,634,339 B2
(45) Date of Patent: Dec. 15, 2009

(54) VEHICLE DRIVE ASSIST DEVICE

(75) Inventor: Shinya Kudo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 294 days.

(21) Appl. No.: 11/403,908

(22) Filed: Apr. 14, 2006

(65) Prior Publication Data

US 2006/0235598 A1    Oct. 19, 2006

(30) Foreign Application Priority Data

Apr. 15, 2005    (JP)    ............... 2005-118706

(51) Int. Cl.
  *B62D 6/00*    (2006.01)
  *G05D 1/00*    (2006.01)
  *G05D 1/08*    (2006.01)
  *B60T 7/12*    (2006.01)

(52) U.S. Cl. .................. 701/41; 701/96; 340/435; 340/438

(58) Field of Classification Search .......... 701/1, 701/23, 36, 37, 38, 39, 41, 42, 43, 70, 71, 701/72, 74, 79, 80, 82, 93, 96, 97, 98, 300, 701/301; 340/901, 902, 903, 904, 435, 436, 340/438, 441, 463, 465–467
  See application file for complete search history.

(56) References Cited

U.S. PATENT DOCUMENTS

| | | | | |
|---|---|---|---|---|
| 6,973,380 | B2 * | 12/2005 | Tange et al. | 701/70 |
| 7,136,755 | B2 * | 11/2006 | Yamamura | 701/301 |
| 2002/0109980 | A1 * | 8/2002 | Santosuosso et al. | 362/92 |
| 2002/0138193 | A1 * | 9/2002 | Miyahara | 701/96 |

FOREIGN PATENT DOCUMENTS

JP    2002-081123    3/2003

* cited by examiner

*Primary Examiner*—Edward Pipala
(74) *Attorney, Agent, or Firm*—Smith, Gambrell & Russell LLP

(57) ABSTRACT

Follow-up steering control is executed in a vehicle speed region where vehicle speed V0 is less than V1, and for a vehicle speed region to the higher speed side, a target yaw rate γt for the vehicle is calculated depending on the current positions of a preceding vehicle and the vehicle, and a power steering instructed current value ic for following up the preceding vehicle is calculated based on the target yaw rate γt and output to an electrical power steering control unit. On the other hand, for a vehicle speed region to the lower speed side, a target steering angle St for the vehicle is calculated depending on the current positions of the preceding vehicle and the vehicle, and a power steering instructed current value ic for following up the preceding vehicle is calculated based on the target steering angle St.

20 Claims, 6 Drawing Sheets

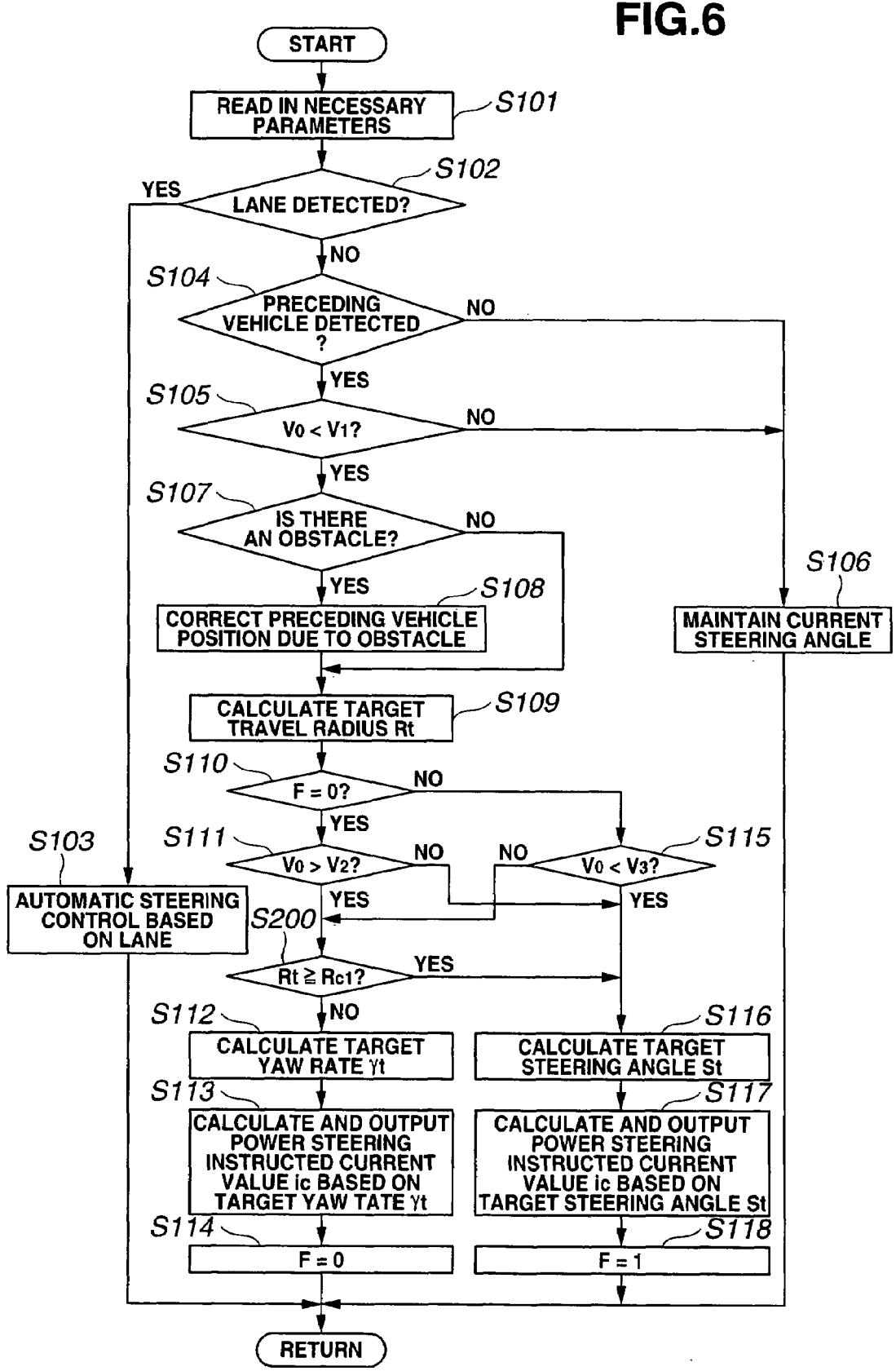

VEHICLE DRIVE ASSIST DEVICE

This application claims benefit of Japanese Application No. 2005-118706 filed on Apr. 15, 2005, the contents of which are incorporated herein by this reference.

BACKGROUND OF THE INVENTION

1. Field of the Invention

The present invention relates to a drive assist device for a vehicle for carrying out automatic steering control by generating steering wheel torque that follows a preceding vehicle.

2. Description of Related Art

In recent years, there has been research and practical implementation of follow-up traveling control follows the preceding vehicle and traveling control device keeps a distance between the vehicle and the preceding vehicle constant, by detecting traveling environment in front of the vehicle using cameras mounted on the vehicle and detecting the preceding vehicle from the traveling environment data.

For example, Japanese Patent Laid-open No. 2003-81123 discloses technology, in a steering control system for a vehicle that detects a traveling lane to cause a vehicle to follow along the traveling lane, for calculating a target yaw rate using forward viewpoint lateral displacement, vehicle speed, and forward viewpoint distance, and generating steering wheel torque so as to obtain the calculated target yaw rate.

However, with the steering control system as disclosed in Japanese Patent Laid-open No. 2003-81123 described above, since target yaw rate is set to carry out steering control, in a specified control region, particularly in a region where sufficient yaw rate is not being generated, such as a low speed region, it is not possible to accurately set a travel locus to be made a target, and there is a problem that it is not possible to carry out follow-up control with respect to the preceding vehicle with good precision.

The present invention has been conceived in view of the above-described problems, and an object of the present invention is to provide a vehicle drive assist device that can accurately obtain a travel locus to be followed even in, for example, a low speed travel region, and that can carry out follow-up control with good precision.

SUMMARY OF THE INVENTION

A drive assist device for a vehicle of the present invention comprises: vehicle travel information detecting means for detecting travel information of a vehicle; preceding vehicle information detecting means for recognizing a preceding vehicle and detecting the preceding vehicle information; target yaw rate calculating means for, when vehicle speed is in previously set first vehicle speed region, calculating a yaw rate to be made a target for the vehicle according to the current position of the preceding vehicle and the current position of the vehicle; first steering control amount calculating means for calculating a first steering control amount to follow up the preceding vehicle based on the yaw rate made the target; target steering angle calculating means for, when the vehicle speed is in a previously set second vehicle speed region, calculating a steering angle to be made a target for the vehicle based on current position of the preceding vehicle and current position of the vehicle; and second steering control amount calculating means for calculating a second steering control amount for following up the preceding vehicle based on the steering angle made the target.

The above and other objects, features and advantages of the invention will become more clearly understood from the following description referring to the accompanying drawings.

BRIEF DESCRIPTION OF THE DRAWINGS

FIG. 6 is a flow chart of the follow-up steering control program according to a second embodiment of the present invention.

DETAILED DESCRIPTION OF PREFERRED EMBODIMENTS

A first embodiment of the present invention will be described in the following based on FIG. 1 to FIG. 5.

Figure 1:
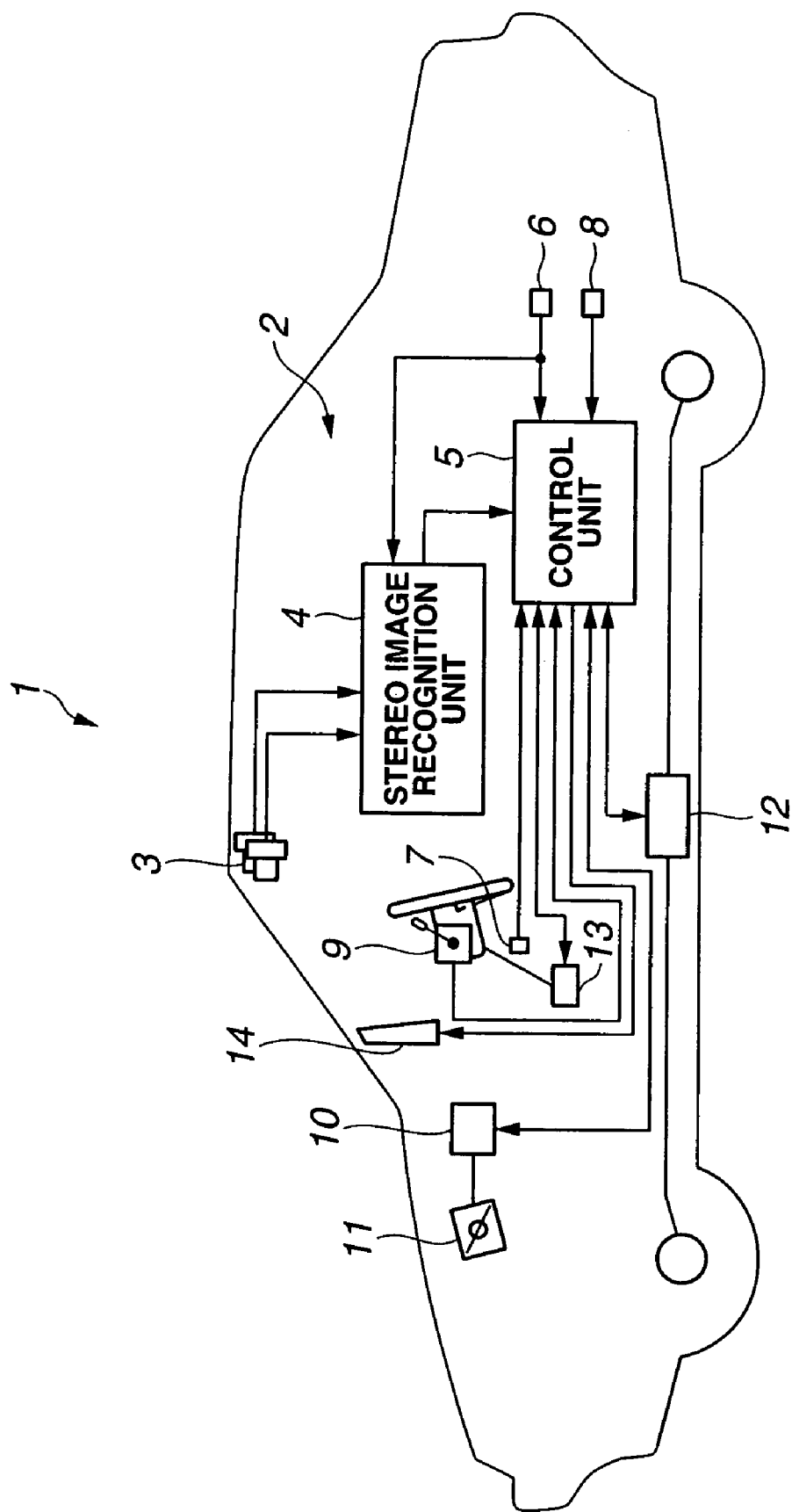
FIG. 1 is a schematic block diagram of a drive assist device mounted on a vehicle according to a first embodiment of the present invention.

In FIG. 1, reference numeral 1 is a vehicle such as a car, and a cruise control system (ACC (Adaptive Cruise Control) system) 2 as one example of a drive assist device is mounted on the vehicle 1. The ACC system 2 has a stereo camera 3, a stereo image recognition unit 4 and a control unit 5 as main component elements. With the ACC system 2, basically, when in a constant speed traveling control state with no preceding vehicle running ahead of the vehicle 1, traveling in a state where a vehicle speed set by the driver is maintained, when there is then a preceding vehicle automatic follow-up control including follow-up acceleration and deceleration control and follow-up steering control is executed. Also, as vehicle traveling information detecting means, a vehicle speed sensor 6 for detecting vehicle speed V0, a steering wheel angle sensor 7 for detecting steering wheel angle θH, and a yaw rate sensor 8 for detecting yaw rate γr are provided with the vehicle 1, with vehicle speed V0 being input to the stereo image recognition unit 4 and the control unit 5, and steering wheel angle θH and yaw rate γr being input to the control unit 5. An ON-OFF signal for a brake pedal is also input from a brake switch, not shown, to the control unit 5.

Also, signals according to various switches from a constant speed traveling switch 9 comprised of a plurality of switch types connected to a constant speed traveling operation lever provided at the side of a steering column etc. are input to the control unit 5. The constant speed traveling switch 9 is made up of a vehicle speed setting switch for setting target vehicle speed at the time of constant speed travel, a coast switch mainly for variable setting of target vehicle speed to a reduced value, and a resume switch for mainly variable setting the target vehicle speed to an increased value, etc. A main switch (not shown in the drawing) for turning constant speed traveling control and automatic follow-up control ON or OFF is also provided in the vicinity of the constant speed traveling operation lever.

The stereo camera 3 is comprised of a set of (left and right) CCD cameras that use solid-state image pick-up device such as charge coupled devices (CCD), for example, as a stereo optical system. These left and right CCD cameras are respectively attached to the front ceiling inside the vehicle compartment a fixed distance apart, they pick up image stereoscopically subjects outside the vehicle from different view points, and output image data to the stereo image recognition unit 4.

Figure 3:
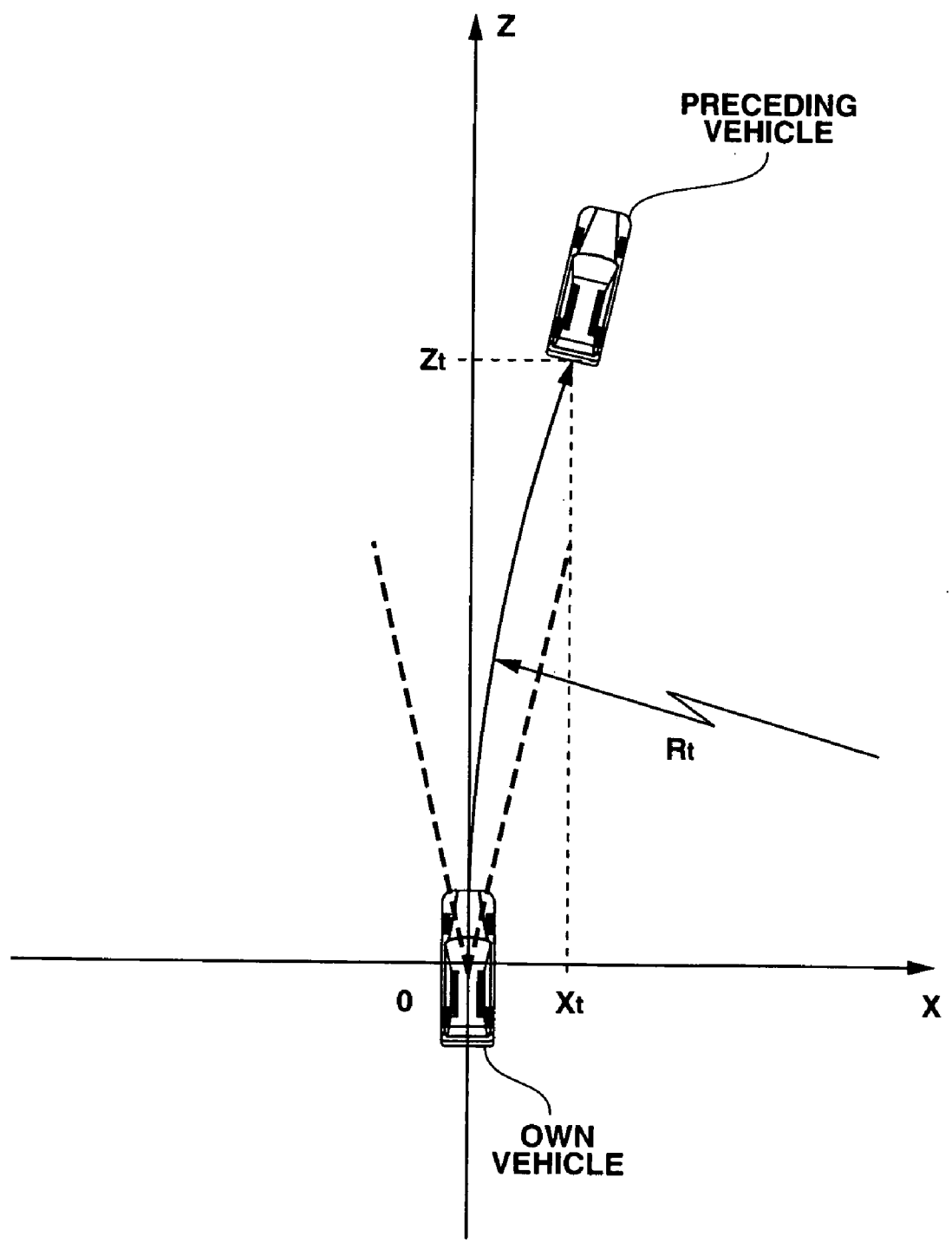
FIG. 3 is an explanatory drawing showing a relationship between a vehicle and a coordinate position of a preceding vehicle, according to the first embodiment of the present invention.

The stereo image recognition unit 4 receives as inputs image data from the stereo camera 3 and vehicle speed V0 from the vehicle speed sensor 6, detects forward information of white line data and solid object data in front of the vehicle 1 based on image data from the stereo camera 3, and estimates a traveling path on which the vehicle 1 will move (vehicle traveling path). The preceding vehicle in front of the vehicle 1 is then extracted, and respective data for the preceding vehicle position (for example, as shown in FIG. 3, a coordinate position on an X-Z coordinate system with the vehicle 1 made the origin), preceding vehicle distance (distance between vehicles), preceding vehicle speed ((amount of change in inter-vehicle distance)+(vehicle speed)) preceding vehicle acceleration (differential value of preceding vehicle speed), position of stationary objects other than preceding vehicle, white line coordinates, white line recognition distance, vehicle traveling path coordinates, etc. are output to the control unit 5.

Here, in the stereo image recognition unit 4, processing of image data from the stereo camera 3 is carried out as follows, for example. First of all, for one set of stereo image pairs for the environment in the traveling direction of the vehicle 1 picked up by the CCD cameras of the stereo camera 3, processing is carried out to obtain distance information using the principle of triangulation from an amount of deviation of corresponding positions, to generate a distance image representing three-dimensional distance distribution. Then, based on this data, well known grouping processing and comparison of previously stored three-dimensional road layout data, solid object data etc., are performed to extract lane data, side wall data such as for guardrails existing along the road, curbs, etc., and data for solid objects such as vehicles.

With the solid object data, distance to the solid object and temporal change in this distance (relative velocity of the vehicle 1) are obtained, and particularly for vehicles on the same traveling path as the vehicle that are extremely close, vehicles that are traveling at a specified speed (for example, 0 km/h or greater) in almost the same direction as the vehicle 1 are extracted as preceding vehicles. Incidentally, any vehicle, among preceding vehicles, that is traveling at a speed of about 0 km/h is recognized as a stopping preceding vehicle. Also, solid object information and preceding vehicle information store positional information for rear surface left end point and right end point, and also store a substantial center of the rear surface left end point and right end point as center of gravity information for a solid object or preceding vehicle. In this way, the stereo camera 3 and stereo image recognition unit 4 are provided as preceding vehicle information detecting means, lane detecting means and obstacle detecting means.

The control unit 5 implements a constant speed traveling control function for carrying out constant speed traveling control so that a traveling speed set by a user operational input is maintained, and an automatic follow-up control (follow-up acceleration and deceleration control and follow-up steering control) function, and if a desired vehicle speed is set by the driver turning a main switch (not shown) ON and using a constant speed traveling operation lever, signals from the constant speed traveling switch 9 are input to the control unit 5. A throttle valve 11 opening degree is then subjected to feedback control as a signal output to a throttle valve control unit 10 so that the vehicle speed detected by the vehicle speed sensor 6 converges to a set speed set by the driver, and either the vehicle 1 automatically travels in the constant speed state or a deceleration signal is input to an automatic brake control unit 12 to cause an automatic braking operation.

Also, when carrying out constant speed traveling control, in the event that the preceding vehicle has been recognized in the stereo image recognition unit 4, the control unit 5 automatically switched to automatic follow-up control, which will be described later. Incidentally, the constant speed traveling control function and the automatic follow-up control function are released in cases such as the driver steps on the brake pedal, when the vehicle speed exceeds a previously determined upper limit value, or when the main switch is turned OFF.

If the travel control for the vehicle shifts to follow-up traveling control, for example, target headway is calculated and set based on vehicle speed, and target acceleration or deceleration is calculated based on the preceding vehicle distance, preceding vehicle speed, vehicle speed, and target headway. Then, the throttle 11 opening degree is feedback controlled as a signal output to the throttle valve control unit 10, or a deceleration signal is output to the automatic brake control unit 12, to cause follow-up traveling (also including follow-up stopping and follow-up starting) (follow-up acceleration and deceleration control).

Figure 2:
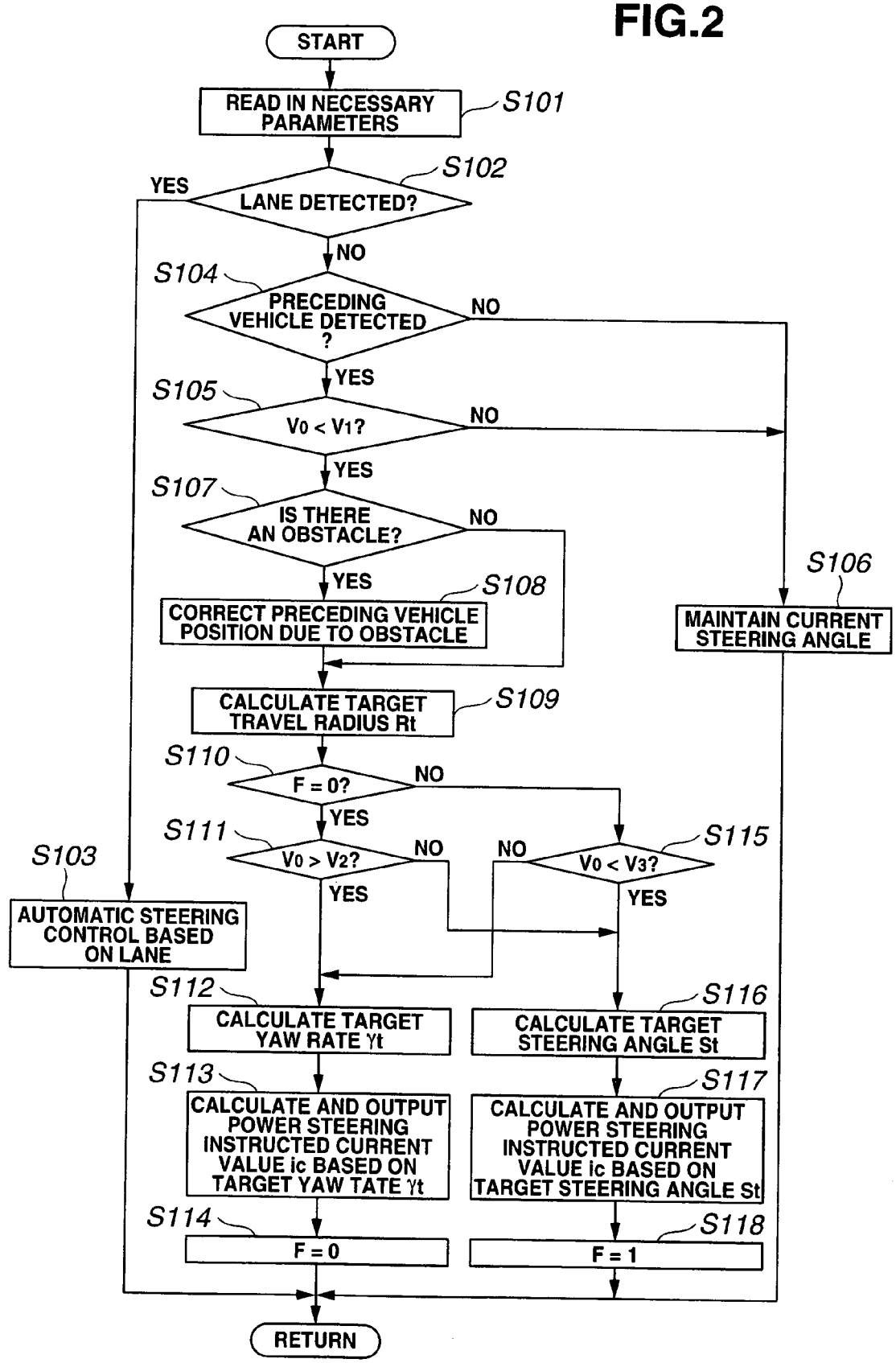
FIG. 2 is a flow chart of a follow-up steering control program according to the first embodiment of the present invention.

Also, when travel control for the vehicle is shifted to follow-up traveling control, and the preceding vehicle performs a change in turning or traveling direction, a power steering instructed current value ic for an electrical power steering control unit 13 is calculated and output, in accordance with FIG. 2, which will be described later, to realize follow-up steering control.

The follow-up steering control is implemented in a region where vehicle speed V0 is less than V1 (for example, 35 km/h). In the case of a vehicle speed region to the higher speed side within the vehicle speed region (a predetermined first vehicle speed region), a yaw rate (target yaw rate) γt that will be made a target for the vehicle 1 is calculated depending on the current position of the preceding vehicle and the current position of the vehicle 1, and the power steering instructed current value ic is calculated as a first steering control amount for following up the preceding vehicle based on the target yaw rate γt and output to the electrical power steering control unit 13.

On the other hand, in the case of a vehicle speed region to the lower speed side within the vehicle speed region (a predetermined second vehicle speed region), a steering angle (target steering angle) St that will be made a target for the vehicle 1 is calculated depending on the current position of the preceding vehicle and the current position of the vehicle 1, and the power steering instructed current value ic is calculated as a second steering control amount for following up the preceding vehicle based on the target steering St and output to the electrical power steering control unit 13.

Incidentally, hysteresis is provided between the higher side vehicle speed region and lower side vehicle speed region. Also, in the case of detecting a vehicle lane, automatic steering control based on the lane (setting a power steering instructed current value ic along the lane) has priority. Further, in the case of detecting an obstacle close to the preceding vehicle, the above mentioned target yaw rate γt and target steering angle St are set to values for avoiding the obstacle. In this way, the control unit 5 is configured having functions as target yaw rate calculating means, first steering control amount calculating means, target steering angle calculating means, and second steering control amount calculating means.

Incidentally, reference numeral 14 is a liquid crystal monitor for displaying respective operating conditions of the ACC system 2, and is also used, for example, by an onboard navigation system.

Next, description will be given of the follow-up steering control of the follow-up traveling control, using the flowchart of FIG. 2. The follow-up steering control program is executed every specified time when main switch of the ACC system 2 has been turned on and follow-up steering control is shifted to, and first of all necessary parameters are read in, in step (hereafter termed "S") 101.

Next, processing advances to S102, and it is determined whether or not a lane is detected. If the result of the determination is that a lane is detected, processing advances to S103 where automatic steering control based on the lane is carried out, and the program exits.

The automatic steering control based on the lane defines a vehicle traveling path parallel to the lane, for example, and sets the power steering instructed current value ic for the electrical power steering control unit 13 so as to steer along this vehicle traveling path.

Conversely, if the result of determination in S102 is that the lane is not detected, processing advances to S104 where it is determined whether or not the preceding vehicle is detected. If the result of determination in S104 is that the preceding vehicle is detected, processing advances to S105 where vehicle speed V0 is compared with a predetermined vehicle speed threshold value V1 (for example, 35 km/h) and if the vehicle speed V0 is less than the vehicle speed threshold value V1 processing advances to S107.

On the other hand, if it is determined in S104 that the preceding vehicle is not detected, or if it is determined in S105 that the vehicle speed V0 is greater than or equal to the vehicle speed threshold value V1, processing advances to S106 where the current steering angle is maintained and the program then exits.

If, in S104, the preceding vehicle is detected, and also it is determined in S105 that the vehicle speed V0 is less than the vehicle speed threshold value V1, processing advances to S107 where it is determined whether or not there is the obstacle in the vicinity of the preceding vehicle. In the event that the determination result in S107 that there is an obstacle in the vicinity of preceding vehicle, processing advances to S108, correction of preceding vehicle position due to obstacle position is carried out, and processing advances to S109. Conversely, if it is determined that there is no obstacle in the vicinity of the preceding vehicle, processing advances directly to S109.

Figure 4:
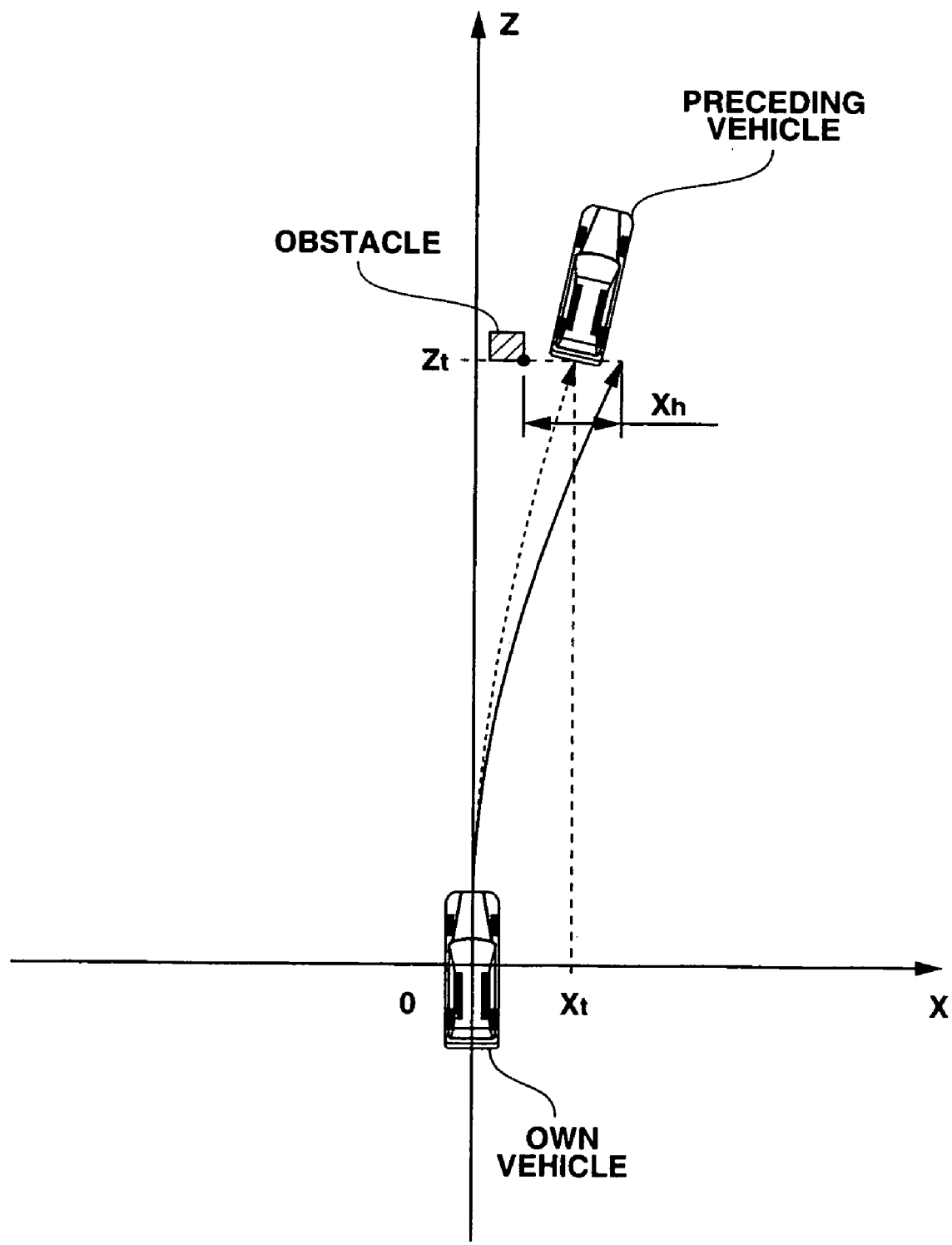
FIG. 4 is a supplementary explanatory drawing for the case where there is an obstacle on the left side of the preceding vehicle, according to the first embodiment of the present invention.

As shown in FIG. 4, for example, in the event that there is the obstacle at the left side of the preceding vehicle, the preceding vehicle position correction due to obstacle position in S108 changes the center of gravity position of the preceding vehicle to be followed up to a position derived by adding length xh (for example, 2.5 m) to an X coordinate of the right end of the obstacle.

Figure 5:
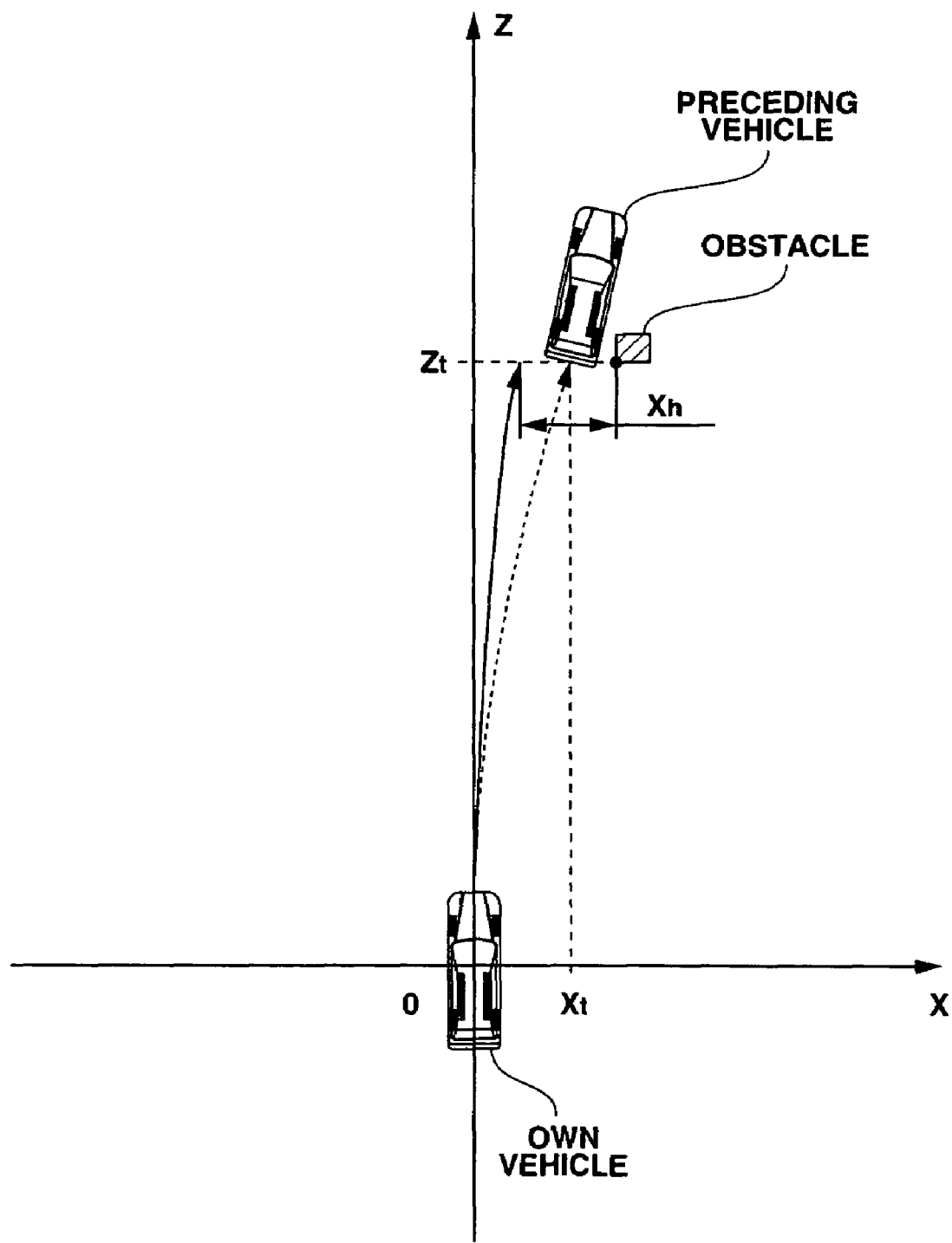
FIG. 5 is a supplementary explanatory drawing for the case where there is the obstacle on the right side of the preceding vehicle, according to the first embodiment of the present invention.

Conversely, as shown in FIG. 5, in the event that there is the obstacle at the right side of the preceding vehicle, the center of gravity position of the preceding vehicle to be followed up is changed to a position derived by subtracting length xh (for example, 2.5 m) from an X coordinate of the left end of the obstacle.

Thus, processing advances to S109 either directly from S107 or after carrying out the preceding position correction in S108, a target travel radius Rt is calculated based on position of the vehicle 1 and position of the preceding vehicle currently, using the following equations (1). Specifically, if, as shown in FIG. 3, in a coordinate system with the vehicle 1 as an origin O, the coordinates of the center of gravity of the preceding vehicle are made (xt, zt), then $$Rt = (xt^2 + zt^2)/(2 \cdot xt) \quad (1)$$

Processing then advances to S110 where it is determined whether or not a control region setting flag F is "0". This control region setting flag F is a flag set to "0" when, within the vehicle speed region made the object of control ($0 \leq V0 < V1$: for example, a region of less than 35 km/h), control is executed in a higher speed region, or set to "1" when executing control in a lower speed region. As will be described later, this is for variable setting of a region to give hysterisis between the lower speed region and the higher speed region.

If the determination result of S110 is that the control region setting flag F is set to "0", namely, the previous time control was executed in the higher speed region, process advances to S111 where it is determined whether or not the vehicle speed V0 is higher than V2 (for example, 20 km/h). If the determination result in S111 is that vehicle speed V0 is higher than V2, control should be executed again in the higher speed region, processing advances to S112, and target yaw rate γt is calculated using equation (2) below.

$$\gamma t = V0/Rt \quad (2)$$

After calculating target yaw rate γt in S112, processing advances to S113, power steering instructed current value ic is calculated from the following equation (3) based on target yaw rate γt, and output, processing advances to S114, the control region setting flag F is set to "0", and the program exits.

$$ic = GSR \cdot (\gamma t - \gamma r) + GVR \cdot (d(\gamma t - \gamma r)/dt) + \quad (3)$$
$$GHR \cdot \int (\gamma t - \gamma r)dt$$

where GSR is proportional gain, GVR is differential gain, and GHR is integral gain.

Also, if the determination result in S111 is that vehicle speed V0 is less than or equal to V2, control should be shifted to the lower speed region, processing advances to S116, and target steering angle St is calculated using equation (4) below.

$$st = (Lw \cdot Ns)/Rt \quad (4)$$

where Lw is wheelbase and Ns is steering gear ratio.

After calculating target steering angle St in S116, processing advances to S117, power steering instructed current value ic is calculated from the following equation (5) based on target steering angle St, and output, processing advances to S118, the control region setting flag F is set to "1", and the program exits.

$$ic = GSS \cdot (St - Sr) + GVS \cdot (d(St - Sr)/dt) + \quad (5)$$
$$GHS \cdot \int (St - Sr)dt$$

where Sr is actual steered angle (=θH/Ns), GSS is proportional gain, GVS is differential gain, and GHS is integral gain.

On the other hand, if the determination result of S110 described above is that the control region setting flag F is set to "1", namely, the previous time control was executed in the lower speed region, process advances to S115 where it is determined whether or not the vehicle speed V0 is lower than V3 (for example, 15 km/h). If the determination result in S115 is that vehicle speed V0 is lower than V3, control should be executed again in the lower speed region, processing advances to S116, and target steering angle St is calculated using equation (4) described above.

After that, processing advances to S117, power steering instructed current value ic is calculated from the above equation (5) based on target steering angle St, and output, processing advances to S118, the control region setting flag F is set to "1", and the program exits.

Also, if the determination result in S115 is that vehicle speed V0 is greater than or equal to V3, control should be shifted to the higher speed region, processing advances to S112, and target yaw rate γt is calculated using equation (2) described above.

After that, processing advances to S113, power steering instructed current value ic is calculated from the above equation (3) based on target yaw rate γt, and output, processing advances to S114, the control region setting flag F is set to "0", and the program exits.

In this way, in the present embodiment, follow-up steering control is executed in a region where vehicle speed V0 is less than V1, and in the case of the higher vehicle speed region within the vehicle speed region, target yaw rate γt for the vehicle 1 is calculated depending on the current position of the preceding vehicle and the current position of the vehicle 1. Power steering instructed current value ic for following up the preceding vehicle is then calculated based on this target yaw rate γt, and output to the electrical power steering control unit 13. On the other hand, in the case of the lower vehicle speed region within the vehicle speed region, target steering angle St for the vehicle 1 is calculated depending on the current position of the preceding vehicle and the current position of the vehicle 1. Power steering instructed current value ic for following up the preceding vehicle is then calculated based on this target steering angle St, and output to the electrical power steering control unit 13. For this reason, it is possible to accurately obtain a travel locus to be followed even in a low speed travel region, for example, and it becomes possible to perform follow-up control with good precision.

Next, a second embodiment of the present invention will be described based on FIG. 6.

Incidentally, in the second embodiment, the control subject region is not only divided into a high speed region and a low speed region, but in the high speed region also, when a target course is regarded as a straight line, power steering instructed current value ic for following up the preceding vehicle is calculated based on the target steering angle St and output to the electrical power steering control unit 13. On the other hand, another case, namely when the target course describes a curved line, power steering instructed current value ic is calculated based on the target yaw rate γt and output to the electrical power steering control unit 13.

Specifically, in S109, target travel radius Rt of the target course is calculated from equation (1) using a relationship between vehicle position and the center of gravity of the preceding vehicle. It is then determined in S111 that speed is greater than or equal to V2, or in S115 that speed is less than or equal to V3, target travel radius Rt is compared with set value Rc1 (for example, 180 m) in S200, and if Rt is greater than or equal to Rc1 target steering angle St is calculated in S116, while if Rt is smaller than Rc1 target yaw rate γt is calculated in S112.

Apart from the above-described points, the same processing as in the above-described first embodiment is carried out, and description thereof is omitted.

In this second embodiment, even if vehicle speed increases, for example, in the case where it is difficult to detect yaw rate at the time of straight line travel etc, control using yaw rate is executed at the time of curved line travel, and it is possible to appropriately exchange yaw rate control and steering angle control.

According to the first and second embodiments, since hysteresis is provided at a boundary between a higher speed region and lower speed region in the control subject region, control is not subject to hunting.

Further, according to the first and second embodiments, when the obstacle exists in the vicinity of the preceding vehicle, since following to avoid the obstacle is performed there is a high degree of safety, and there is no feeling of anxiety caused to the driver when passing extremely close to the obstacle.

Also, according to the first and second embodiments, setting of the travel route along the lane is given priority when the lane is detected, thus stable follow-up steering control along the lane is carried out.

Incidentally, in the follow-up steering control along the lane, the configuration where priority is given to follow-up control in the case of detecting the lane is not limited, and it is also possible to have a configuration where follow-up steering control along the lane is carried out in the case where the lane is detected in a situation where the preceding vehicle is not detected. In this case, lane follow-up steering control is performed as a supplement to follow-up control with respect to the preceding vehicle, and can perform follow-up control with good precision, thus making it possible to continue execution of follow-up steering control.

Incidentally, the power steering instructed current value ic set in the electrical power steering control unit 13 is limited by a specified current value (for example, a control maximum steering wheel torque corresponding value 5 Nm), and can also be set so that excessive steering force can not be applied. Also, follow-up acceleration and deceleration control for automatic follow-up control is not limited to these embodiments. Further, with these embodiments, recognition of the preceding vehicle has been carried out based on images from a stereo camera, but it is also possible to perform recognition with other techniques, for example, based on information from a millimeter-wave radar and a monocular camera.

Having described the preferred embodiments of the invention referring to the accompanying drawings, it should be understood that the present invention is not limited to those precise embodiments, and various changes and modifications thereof could be made by one skilled in the art without departing from the spirit or scope of the invention as defined in the appended claims.

What is claimed is:

1. A drive assist device for a vehicle, comprising:
vehicle travel information detecting means for detecting travel information of a vehicle;
preceding vehicle information detecting means for recognizing a preceding vehicle and detecting the preceding vehicle information;
target yaw rate calculating means for, when vehicle speed is in a previously set first vehicle speed region, calculating a yaw rate to be made a target for the vehicle based on the travel information and the preceding vehicle information;

first steering control amount calculating means for calculating a first steering control amount to follow up the preceding vehicle based on the yaw rate made the target;

target steering angle calculating means for, when the vehicle speed is in a previously set second vehicle speed region, calculating a steering angle to be made a target for the vehicle based on the travel information and the preceding vehicle information; and second steering control amount calculating means for calculating a second steering control amount for following up the preceding vehicle based on the steering angle made the target, wherein the first vehicle speed region is greater than the second vehicle speed region in speed.

2. The drive assist device for the vehicle as disclosed in claim 1, wherein hysteresis is provided between the first vehicle speed region and the second vehicle speed region, so that the case of a transition from a state where the first steering control amount has been calculated by the first steering amount calculating means to a state where the second steering amount is calculated by the second steering control amount calculating means, it is different to the case of a transition from a state where the second steering control amount has been calculated by the second steering amount calculating means to a state where the first steering amount is calculated by the first steering control amount calculating means.

3. The drive assist device for the vehicle, as disclosed in claim 1, including lane detecting means for detecting a lane, wherein when the lane is detected steering control along the lane is executed with priority.

4. The drive assist device for the vehicle, as disclosed in claim 2, including lane detecting means for detecting a lane, wherein when the lane is detected steering control along the lane is executed with priority.

5. The drive assist device for the vehicle, as disclosed in claim 1, including lane detecting means for detecting a lane, and in a situation where a preceding vehicle is not detected, when the lane is detected steering control along the lane is executed with priority.

6. The drive assist device for the vehicle, as disclosed in claim 2, including lane detecting means for detecting a lane, and in a situation where a preceding vehicle is not detected, when the lane is detected steering control along the lane is executed with priority.

7. The drive assist device for the vehicle as disclosed in claim 1, including obstacle detecting means for detecting an obstacle, wherein when the obstacle is detected in the vicinity of the preceding vehicle, the yaw rate made a target and the steering angle made a target are calculated corrected as necessary to avoid the obstacle.

8. The drive assist device for the vehicle as disclosed in claim 2, including obstacle detecting means for detecting an obstacle, wherein when the obstacle is detected in the vicinity of the preceding vehicle, the yaw rate made a target and the steering angle made a target are calculated corrected as necessary to avoid the obstacle.

9. The drive assist device for the vehicle as disclosed in claim 3, including obstacle detecting means for detecting an obstacle, wherein when the obstacle is detected in the vicinity of the preceding vehicle, the yaw rate made a target and the steering angle made a target are calculated and corrected as necessary to avoid the obstacle.

10. The drive assist device for the vehicle as disclosed in claim 4, including obstacle detecting means for detecting an obstacle, wherein when the obstacle is detected in the vicinity of the preceding vehicle, the yaw rate made a target and the steering angle made a target are calculated and corrected as necessary to avoid the obstacle.

11. The drive assist device for the vehicle as disclosed in claim 1, wherein, even in the first vehicle speed region, when a target path of the vehicle is regarded as a straight line, a steering angle to be made a target of the vehicle is calculated depending on the current position of the preceding vehicle and the current position of the vehicle, and when the target path is regarded as a curved path, yaw rate to be made a target for the vehicle is calculated depending on the current position of the preceding vehicle and the current position of the vehicle.

12. The drive assist device for the vehicle as disclosed in claim 2, wherein, even in the first vehicle speed region, when a target path of the vehicle is regarded as a straight line, a steering angle to be made a target of the vehicle is calculated depending on the current position of the preceding vehicle and the current position of the vehicle, and when the target path is regarded as a curved path, yaw rate to be made a target for the vehicle is calculated depending on the current position of the preceding vehicle and the current position of the vehicle.

13. The drive assist device for the vehicle as disclosed in claim 3, wherein, even in the first vehicle speed region, when a target path of the vehicle is regarded as a straight line, a steering angle to be made a target of the vehicle is calculated depending on the current position of the preceding vehicle and the current position of the vehicle, and when the target path is regarded as a curved path, yaw rate to be made a target for the vehicle is calculated depending on the current position of the preceding vehicle and the current position of the vehicle.

14. The drive assist device for the vehicle as disclosed in claim 4, wherein, even in the first vehicle speed region, when a target path of the vehicle is regarded as a straight line, a steering angle to be made a target of the vehicle is calculated depending on the current position of the preceding vehicle and the current position of the vehicle, and when the target path is regarded as a curved path, yaw rate to be made a target for the vehicle is calculated depending on the current position of the preceding vehicle and the current position of the vehicle.

15. The drive assist device for the vehicle as disclosed in claim 5, wherein, even in the first vehicle speed region, when a target path of the vehicle is regarded as a straight line, a steering angle to be made a target of the vehicle is calculated depending on the current position of the preceding vehicle and the current position of the vehicle, and when the target path is regarded as a curved path, yaw rate to be made a target for the vehicle is calculated depending on the current position of the preceding vehicle and the current position of the vehicle.

16. The drive assist device for the vehicle as disclosed in claim 6, wherein, even in the first vehicle speed region, when a target path of the vehicle is regarded as a straight line, a steering angle to be made a target of the vehicle is calculated depending on the current position of the preceding vehicle and the current position of the vehicle, and when the target path is regarded as a curved path, yaw rate to be made a target for the vehicle is calculated depending on the current position of the preceding vehicle and the current position of the vehicle.

17. The drive assist device for the vehicle as disclosed in claim 7, wherein, even in the first vehicle speed region, when a target path of the vehicle is regarded as a straight line, a steering angle to be made a target of the vehicle is calculated depending on the current position of the preceding vehicle and the current position of the vehicle, and when the target path is regarded as a curved path, yaw rate to be made a target for the vehicle is calculated depending on the current position of the preceding vehicle and the current position of the vehicle.

18. The drive assist device for the vehicle as disclosed in claim 8, wherein, even in the first vehicle speed region, when a target path of the vehicle is regarded as a straight line, a steering angle to be made a target of the vehicle is calculated depending on the current position of the preceding vehicle and the current position of the vehicle, and when the target path is regarded as a curved path, yaw rate to be made a target for the vehicle is calculated depending on the current position of the preceding vehicle and the current position of the vehicle.

19. The drive assist device for the vehicle as disclosed in claim 9, wherein, even in the first vehicle speed region, when a target path of the vehicle is regarded as a straight line, a steering angle to be made a target of the vehicle is calculated depending on the current position of the preceding vehicle and the current position of the vehicle, and when the target path is regarded as a curved path, yaw rate to be made a target for the vehicle is calculated depending on the current position of the preceding vehicle and the current position of the vehicle.

20. The drive assist device for the vehicle as disclosed in claim 10, wherein, even in the first vehicle speed region, when a target path of the vehicle is regarded as a straight line, a steering angle to be made a target of the vehicle is calculated depending on the current position of the preceding vehicle and the current position of the vehicle, and when the target path is regarded as a curved path, yaw rate to be made a target for the vehicle is calculated depending on the current position of the preceding vehicle and the current position of the vehicle.

* * * * *